US011555718B2

(12) United States Patent
Hansen et al.

(10) Patent No.: US 11,555,718 B2
(45) Date of Patent: Jan. 17, 2023

(54) DEVICES HAVING COMMUNICATION CIRCUITRY DECOUPLED FROM DEVICE CIRCUITRY AND RELATED METERS AND HOUSINGS

(71) Applicant: Sensus Spectrum, LLC, Morrisville, NC (US)

(72) Inventors: Adam Hansen, Cary, NC (US); James Malone Giarelli, Raleigh, NC (US); John Kevin Schoolcraft, Sanford, NC (US)

(73) Assignee: Sensus Spectrum, LLC, Morrisville, NC (US)

( * ) Notice: Subject to any disclaimer, the term of this patent is extended or adjusted under 35 U.S.C. 154(b) by 476 days.

(21) Appl. No.: 16/745,891

(22) Filed: Jan. 17, 2020

(65) Prior Publication Data

US 2020/0232814 A1    Jul. 23, 2020

Related U.S. Application Data

(60) Provisional application No. 62/794,240, filed on Jan. 18, 2019.

(51) Int. Cl.
G01D 9/00 (2006.01)
G01D 4/00 (2006.01)
H04Q 9/00 (2006.01)

(52) U.S. Cl.
CPC ............. G01D 9/005 (2013.01); G01D 4/002 (2013.01); H04Q 9/00 (2013.01)

(58) Field of Classification Search
CPC ........ G01D 4/002; G01D 4/004; G01D 21/00; G01D 9/005; H04Q 9/00
See application file for complete search history.

(56) References Cited

U.S. PATENT DOCUMENTS

| 4,119,948 | A | 10/1978 | Ward et al. |
| 2008/0186200 | A1* | 8/2008 | Laughlin-Parker .... G01D 4/006 340/870.02 |
| 2014/0120843 | A1 | 5/2014 | Yamaji |

FOREIGN PATENT DOCUMENTS

| FR | 2 855 294 A1 | 11/2004 |
| KR | 101 238 915 B1 | 3/2013 |

OTHER PUBLICATIONS

Tewolde et al., "Determining appliance energy usage with a high-resolution metering system for residential natural gas meters," Applied Energy 108, 2019.-pp. 363-372 (Year: 2013).*
Tewolde et al., "Determining appliance energy usage with a high-resolution metering system for residential natural gas meters," Applied Energy 108, 2013, pp. 363-372.
Notification of Transmittal of the International Search Report and the Written Opinion of the International Searching Authority, or the Declaration, PCT/US2020/014032, dated Sep. 15, 2020, 17 pages.

* cited by examiner

*Primary Examiner* — Kyaw Z Soe
(74) *Attorney, Agent, or Firm* — Stanek Lemon Crouse & Meeks, PA

(57) ABSTRACT

A meter assembly is provided including a register or an index associated with a meter; and a communication circuit decoupled from the register or the index and configured to communicate with the register or the index using an optical communication link between the register or the index and the communication circuit. Related communication circuit housings are provided.

19 Claims, 17 Drawing Sheets

DEVICES HAVING COMMUNICATION CIRCUITRY DECOUPLED FROM DEVICE CIRCUITRY AND RELATED METERS AND HOUSINGS

CLAIM OF PRIORITY

This application claims priority to U.S. Provisional Application Ser. No. 62/794,240 entitled Registers Having Communications Circuits Decoupled from the Register Circuitry, filed on Jan. 18, 2019, the disclosure of which is hereby incorporated herein by reference.

FIELD

The present inventive concept relates generally to devices having communication capability and, more particularly, to devices that are decoupled from the communication circuitry.

BACKGROUND

Registers/indexes are used in combination with electronic devices, such as water meters, gas meters, electric meters and the like, to collect data associated with the device and make this data available to other devices. For example, the collected data may be provided to a radio circuit associated with the register/index, which may then be accessed by devices at a remote locations using the radio circuit. The ability to access data from the registers/indexes through the radio and provide the data collected at the registers/indexes to a remote location allows the data collected at the register/index to communicate data, such as usage data, vibration data, temperature data, alarms and the like to the remote location. The data communicated from the device can be analyzed and problems with the device may be diagnosed remotely, rather than having a technician on site with the device.

SUMMARY

Some embodiments of the present inventive concept provide a meter assembly including a register or an index associated with a meter; and a communication circuit decoupled from the register or the index and configured to communicate with the register or the index using an optical communication link between the register or the index and the communication circuit.

In further embodiments, when the meter is a water meter, the register may be associated with the water meter and when the meter is a gas meter, the index may be associated with the gas meter In still further embodiments, the communication circuit may further include a pulse output to communicate to and from third party devices remote from the meter assembly; and/or a serial output used for high power or low power radio communications with third party devices remote from the meter assembly.

In some embodiments, the communication circuit may be further configured to couple one or more additional devices to the meter assembly and provide communication between the one or more additional devices and the meter assembly.

In further embodiments, an optically compatible radio endpoint may be coupled to multiple communication circuits each associated with multiple devices, the optically compatible smart point may be coupled to the multiple communication circuits using one of an active and a passive splitter.

In still further embodiments, the communication circuit may be coupled to a device remote from the meter assembly using one of an active or passive cable.

In some embodiments, the communication circuit may be configured to communicate with another communication circuit associated with a valve of the meter assembly and operations of the valve may be controlled based on communications between the communication circuits.

In further embodiments, the optical communications link may be provided by an infrared link.

Still further embodiments of the present inventive concept provide a communication circuit housing including a first portion configured to receive a communication circuit board and having an opening on a first surface thereof; and a second portion configured to enclose the communication circuit board inside the first portion, the communication circuit board housing being configured to be received by a housing of a separate device such that the communication circuit housing and the housing of the separate device appear as one unit. The communication circuit board in the communication circuit housing is configured to communicate with a device in the device housing through the opening defined by the first portion of the communication circuit housing.

In some embodiments, the communication circuit housing may include a plastic injection molded housing, for example, a glass filled polycarbonate material.

In further embodiments, the first portion of the communication circuit housing may be configured to receive a potting material in the first portion of the communication circuit housing. The potting material may extend around all surfaces of the communication circuit board in the first portion of the communication circuit housing.

In still further embodiments, the communication circuit housing may further include a cap positioned on the opening in the first portion of the communication circuit housing. The cap may be configured to contact a clear surface of the device and facilitate optical communication between the communication circuit board and the device.

In some embodiments, the cap may include a material including silicone and the clear surface may be glass.

In further embodiments, the optical communication may be one of infrared communication, visible light communication, near-field communication and Bluetooth.

In still further embodiments, the device may be a register.

In some embodiments, the register may be configured to be used with a meter.

In further embodiments, the communication circuit board may communicate with the device through the opening without any wires.

DETAILED DESCRIPTION

Figure 1:
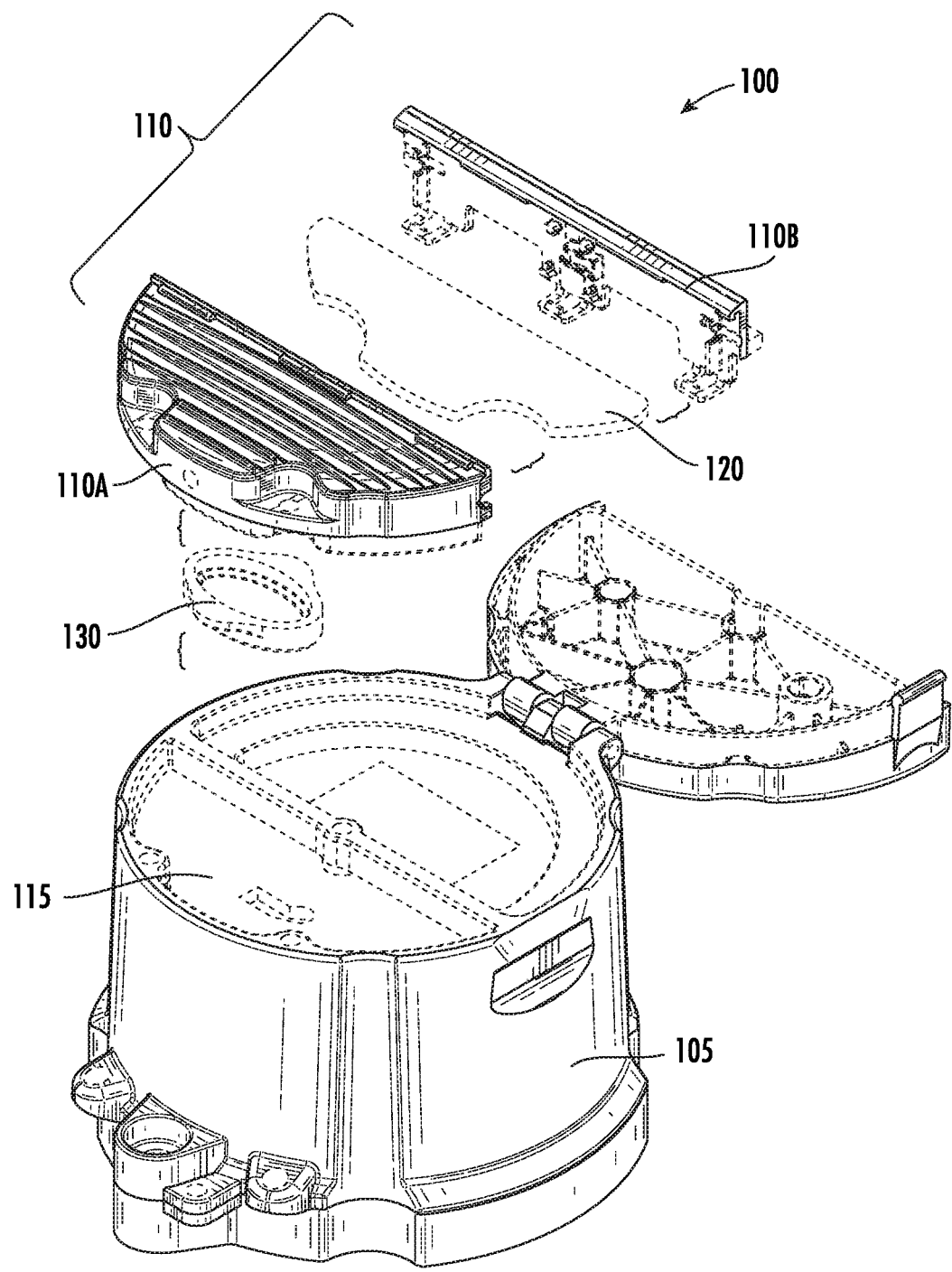
FIG. 1 is a diagram illustrating an exploded view of a register in accordance with some embodiments of the present inventive concept.

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As discussed above, current designs for registers/indexes include an associated communication circuit. The communication circuit generally communicates with remote devices using wires and traditional coupling means. Communication over wires is generally a slow form of communication and wires and the connections thereof are subject to corrosion and deterioration due to exposure to elements. Accordingly, some embodiments of the present inventive concept provide a register/index having a communication circuit that is separated (decoupled) from the remaining circuitry of the register. Communication between the communication circuit and the remaining circuitry is performed without wires and the communication circuit is potted in a separate housing to avoid deterioration thereof as will be discussed further below with respect to FIGS. 1 through 16.

Embodiments of the present inventive concept are discussed herein with respect to a register having a communication circuit that is decoupled therefrom. The decoupling of the register and the communication circuit is enabled by an optical communication between the register and the communication circuit. Details with respect to the optical communication will be discussed herein. Although embodiments discussed herein may be discussed with respect to registers and waters meters, embodiments of the present inventive concept may be used with respect to indexes and gas meters or any other devices that may utilize the decoupling of the various functionalities as discussed herein.

Referring first to FIG. 1, an exploded view of a register assembly including the separate housing for the communication circuit in accordance with some embodiments discussed herein will be discussed. As illustrated in FIG. 1, the register assembly 100 includes a register bonnet (housing) 105, a communication circuit housing 110, a communication barrier 115, a printed circuit board (PCB)/communication circuit 120 and a cap 130. It will be understood that the register assembly 100 of FIG. 1 is provided for example only and, therefore, embodiments of the present inventive concept are not limited to this configuration.

In some embodiments, the register housing 105 may be molded plastic and may contain the general components of a register used to monitor a device, for example, a gas meter, water meter, electric meter and the like. Components of an example register assembly 100 including a register 106 will be discussed further herein with respect to the exploded view of FIG. 6.

Figure 2:
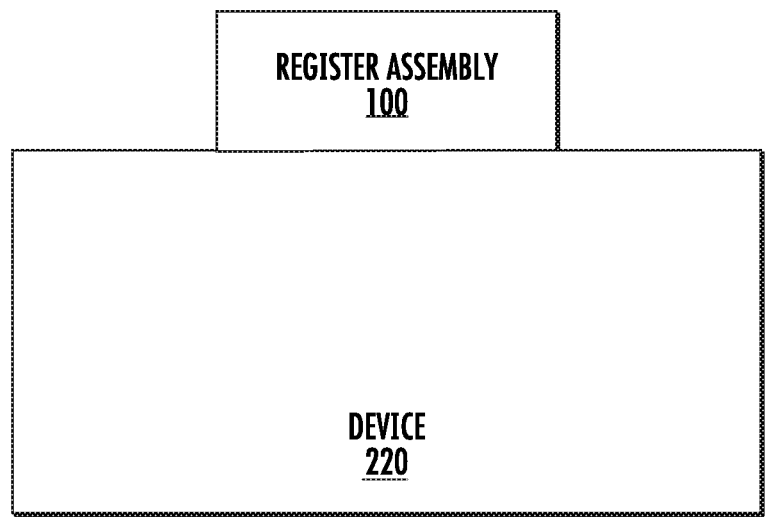
FIG. 2 is a simple block diagram showing positioning of a register on a device in accordance with some embodiments of the present inventive concept.

As illustrated in FIG. 2, the register assembly 100 may be positioned on the device 220 and is in communication with the device. It will be understood that FIG. 2 is provided as an example only and that embodiments of the present inventive concept are not limited to this configuration. Although embodiments of the present inventive concept are discussed herein with respect to the device 220 being a meter, embodiments of the present inventive concept are not limited to meters. In particular, the register assembly 100 can be used in combination with any device 220 that lends itself to the functionality thereof without departing from the scope of the present inventive concept.

Referring again to FIG. 1, an upper surface of the register 106 has a translucent or clear surface (communication barrier) 115 such that light can pass through the surface 115. For example, in some embodiments, the surface 115 can be glass, however, embodiments of the present inventive concept are not limited thereto. The communication circuit/PCB housing 110 is positioned on the register housing 105 such that the communication circuit 110 can communicate with the register circuitry through the translucent or clear surface 115. In some embodiments, the mode of communication through the glass is infrared (IR) as will be discussed further below with respect to FIG. 5. However, any optical communication method can be used without departing from the scope of the present inventive concept.

As further illustrated in FIG. 1, the communication circuit housing 110 has two portions 110A and 110B. Together the first and second portions 110A and 110B, respectively, may be referred to as an e-Hat. The first portion 110A is a housing configured to receive the communication circuit 120 and the second portion 110B is a lid for the housing 110A. In some embodiments, the communication circuit housing 110 is a plastic injection molded case 110A and lid 110B that encloses the communication circuit/PCB 120 assembly. The plastic housing 110 may be a glass filled polycarbonate in some embodiments. In some embodiments, the glass filled polycarbonate is about twenty percent glass filled.

Once the PCB 120 is positioned in the housing 110, the PCB can be potted therein using any known potting material (565 of FIG. 5), however, the material must be compatible with communicating optically, for example, via IR. In other words, the material should be clear or translucent so that light can transmit through it. In some embodiments, the potting material 565 may be provided by SilGel material offered by Wacker, for example, Wacker Silgel® 612. The communication circuit housing 110 is designed to be mounted above the main housing 105 of the electronic register. When the communication circuit 110 is positioned on the housing 105, the system appears as one contiguous register assembly 100 as shown in, for example, FIG. 3.

Figure 4A:
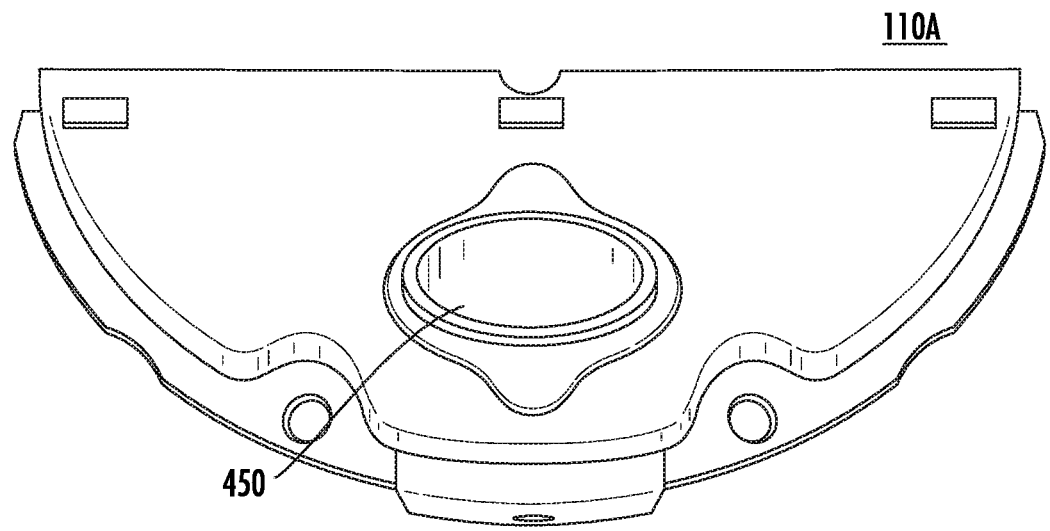
FIGS. 4A and 4B are diagrams illustrating a lower surface of the communication circuit housing including an opening therein and a cap thereon, respectively, in accordance with some embodiments of the present inventive concept.
Figure 4B:
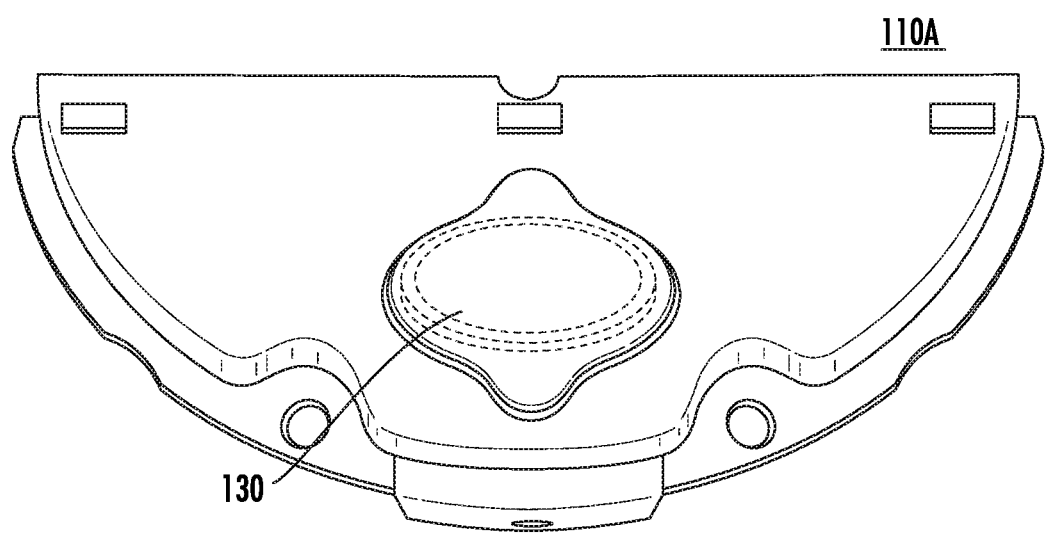

An upper surface of the communication circuit housing 110 is shown in FIG. 1. An opposite, lower surface of the communication circuit housing 110 is illustrated, for example, in FIGS. 4A and 4B. As illustrated in FIG. 4A, the lower surface of the communication circuit housing 110 contains an opening 450 therein. The opening 450 is configured to receive the cap 130 (FIG. 1). FIG. 4B illustrates the cap 130 positioned on the opening 450. The cap 130 is made a clear, malleable material, such as silicone. When the cap 130 is positioned on the opening 450 as shown in FIG. 4B and the housing 110 is positioned on the register housing 105, the cap 130 is in contact with the clear surface 115 so that the optical (IR) communication, from the communication circuit 120 and the register circuitry is facilitated. As discussed above, it will be understood that embodiments of the present inventive concept are not limited to IR communications, thus, other types of communication can be used without departing from the scope of the present inventive concept. For example, the communication could be visible light communication, near-field communication (NFC), Bluetooth or any other type of communication that can be utilized as discussed herein.

Figure 3:
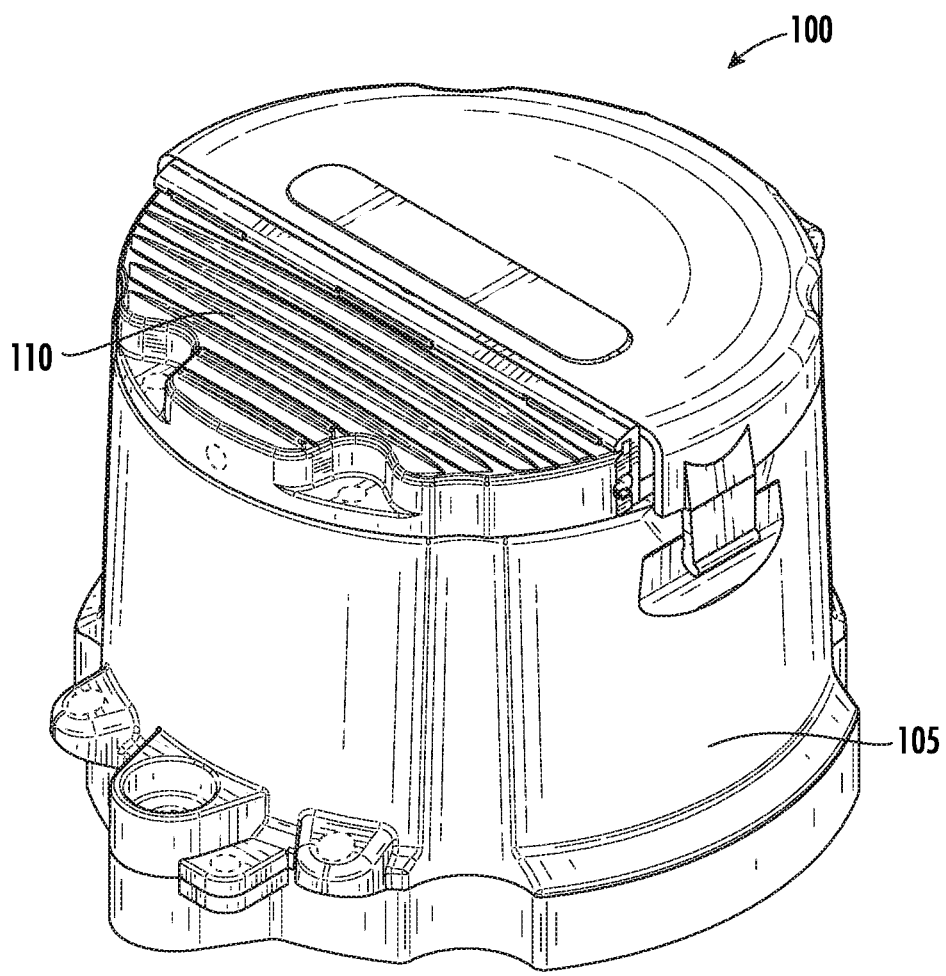
FIG. 3 is a diagram illustrating a fully assembled register including the communication circuit housing in accordance with some embodiments of the present inventive concept.

Thus, in some embodiments, when the register assembly 100 is configured as shown in FIG. 3, the communication circuit 120 communicates through the potting material (565 of FIG. 5), the cap 130 (e.g. clear silicone), and the clear surface (e.g. glass) 115 of the register 106, to the circuitry (printed circuit board—570 of FIG. 5) of the electronic register 100. Some embodiments discussed herein are configured to provide a communication circuit housing that allows a potting material to fully enclose and contact the communication circuit 130, while maintaining clarity to communicate with the remaining circuitry of the electronic register.

Figure 5:
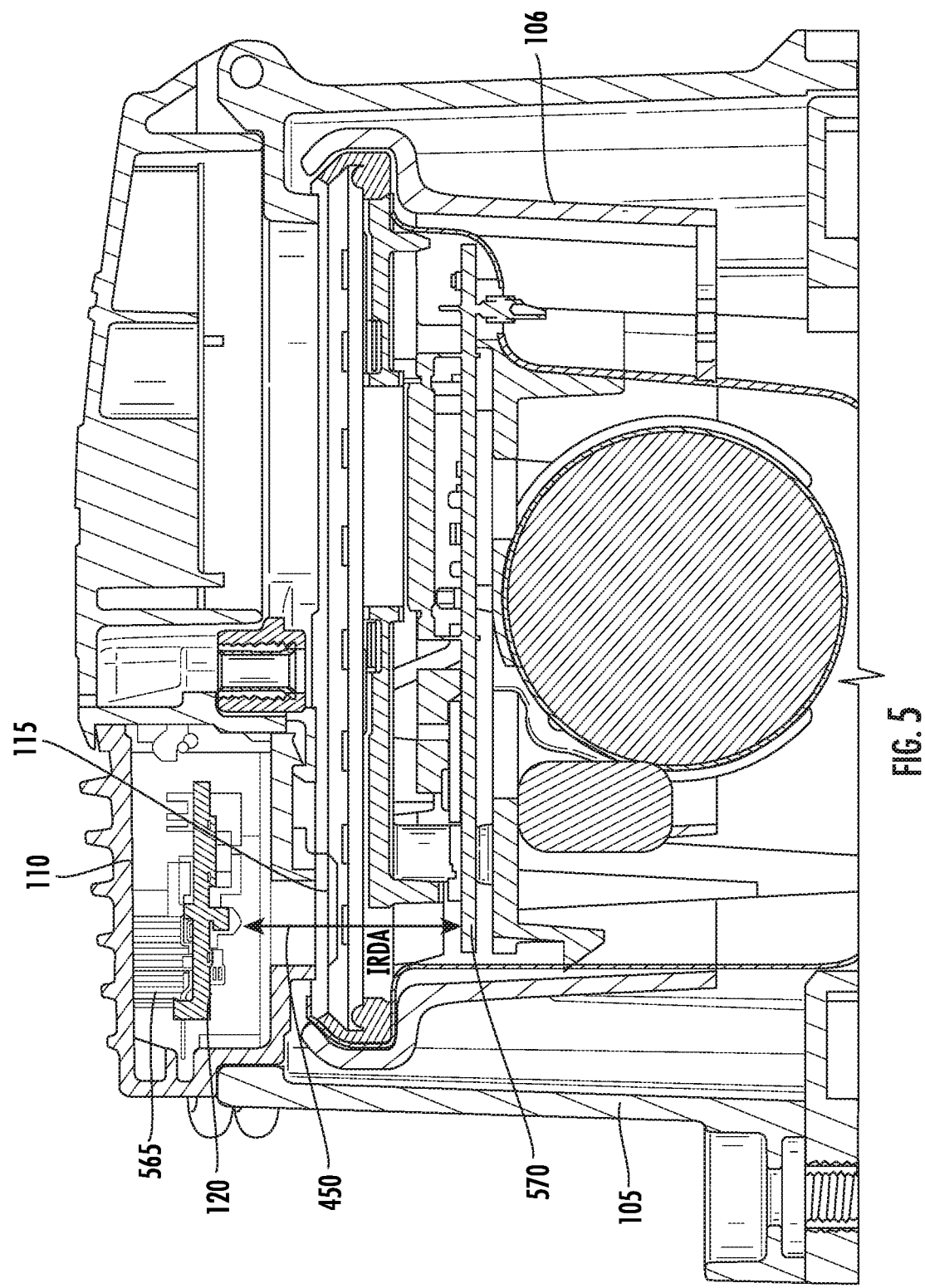
FIG. 5 is a cross-section of the register illustrating an IR link between the communication circuit and the register in accordance with some embodiments of the present inventive concept.

This functionality is clearly illustrated in FIG. 5 of the present application. As illustrated in FIG. 5, the PCB 120 is positioned in the communication circuit housing 110 and the PCB 120 is potted 565. The communication circuit housing 110 is positioned on the body of the register housing (register bonnet) 105 and on the clear surface 115. The cap 130 is positioned on the opening 450 and the cap contacts the clear surface. The communication circuit 120 communicates with the PCB 570 of the register 106 through the opening 450 and the glass. As illustrated, the communication may include IR communication as shown in FIG. 5, but other types of communication may be used without departing from the scope of the present inventive concept. For example, the communication could be visible light communication, near-field communication (NFC), Bluetooth or any other type of communication that can be utilized as discussed herein.

Figure 6:
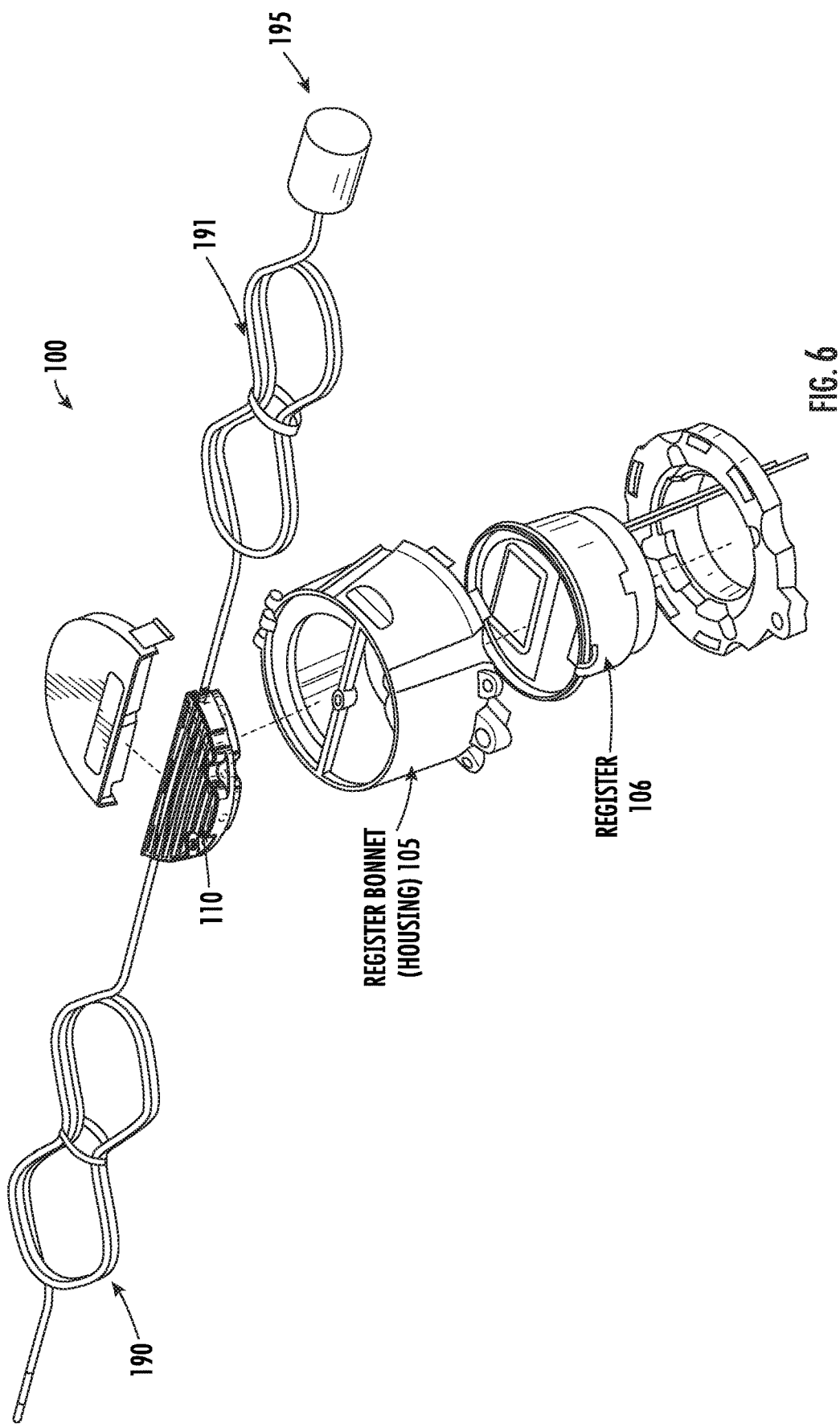
FIG. 6 is an exploded view illustrating various aspects of the register in accordance with some embodiment of the present inventive concept.
Figure 9:
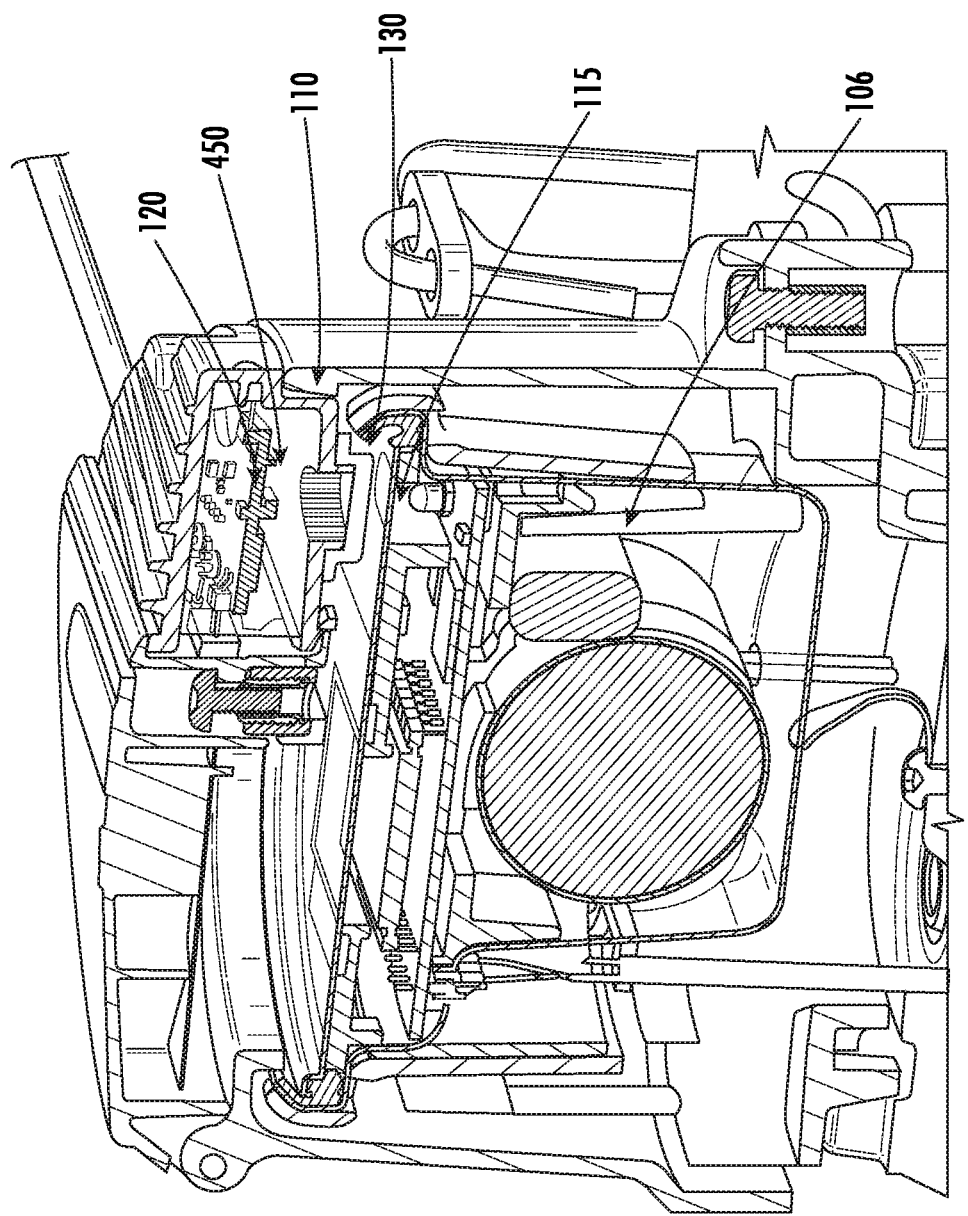
FIG. 9 is a cross-section of the register illustrating various aspects of the register in accordance with various embodiments of the present inventive concept.
Figure 10:
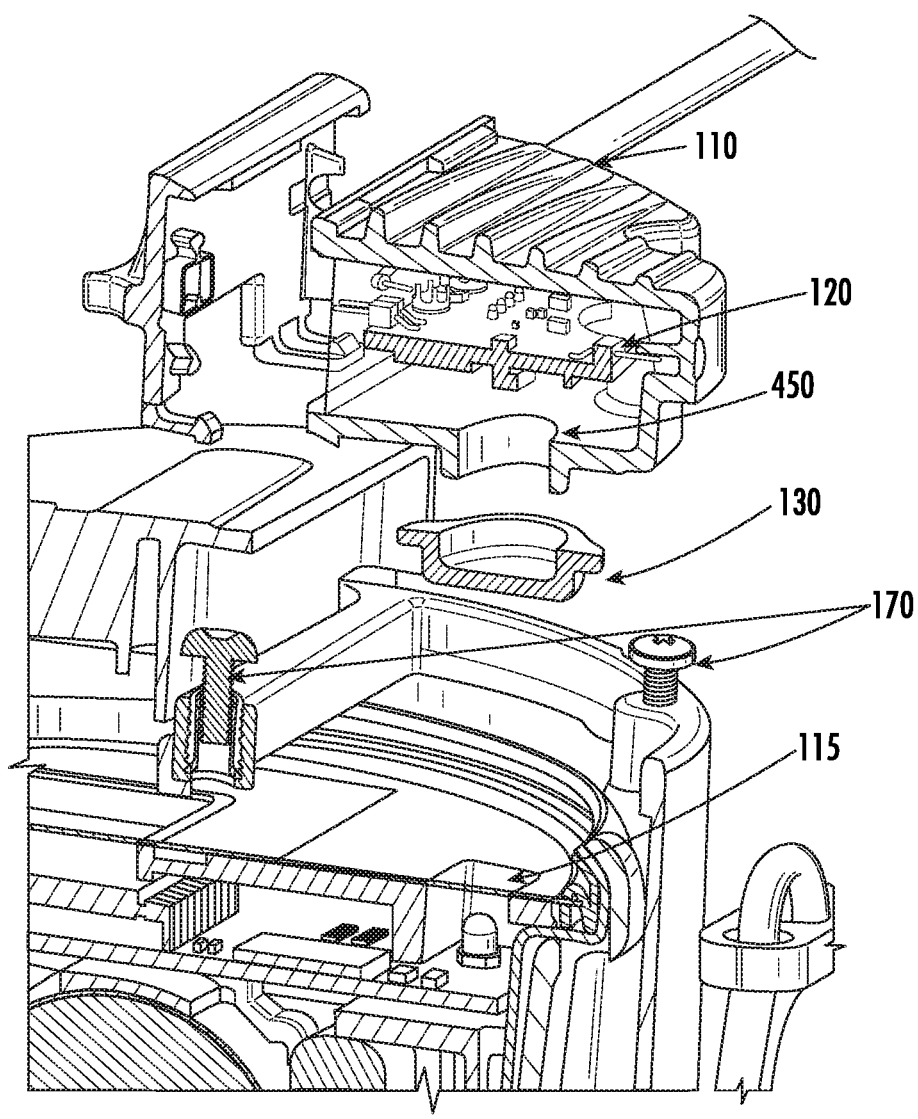
FIG. 10 is a cross section of the register illustrating positioning of the communication circuit housing in accordance with some embodiments of the present inventive concept.

As exploded view of the register assembly 100 is illustrated in FIG. 6. The register assembly 100 includes the communication circuit housing 110 (e-hat), the register housing 105, and the register 106 itself. FIGS. 9 and 10 are cross sections illustrating how the various components of the register assembly 100 fit together in accordance with embodiments discussed herein. For example, FIG. 9 clearly illustrates, the potting material 450 surrounding the communication circuit 120, the glass 115 between the communication circuit 120 and the register 106 and the cap 130 positioned on the communication circuit housing 110. FIG. 10 also illustrates, the potting material 450 surrounding the communication circuit 120, the glass 115 between the communication circuit 120 and the register 106 and the cap 130 to be positioned on the communication circuit housing 110. However, FIG. 10 also illustrates screws 170 provided to connect the communication circuit housing 110 to the register housing 105. It will be understood that the housings may be connected using different means without departing from the scope of the present inventive concept.

Referring again to FIG. 6, wires 190 and 191 are also shown connected to the communication circuit housing 110. The first wire 190 may provide a pulse output to/from third party equipment in some embodiments. The second wire 191 may be coupled to a serial output 195 and may be used for radio communications beyond the communication circuit. As discussed above, although these connections are illustrated as wired in FIG. 6, in some embodiments, wireless connections may be used without departing from the scope of the present inventive concept.

Embodiments discussed herein provide a register assembly 100 that has the rigidity and rib structure to withstand a weight of a person standing on it. Thus, when the register assembly 100 is installed at a customer location, the housing 105 may not be easily damaged. In some embodiments, the communication circuit housing 110 has been designed to aesthetically match the curvature of the lid of the register in the x, y, and z directions as illustrated in FIG. 3.

As discussed above, embodiments of the present inventive concept provide a communication circuit 120 that is de-coupled from the circuitry 570 of the electronic register 106 (FIG. 6). Providing the communication circuit in a separate housing and potting the communication circuit in the housing and communicating using, for example, IR, may remove wire protrusions/leak paths in the electronic register allowing possible modularity for future applications.

Figure 7:
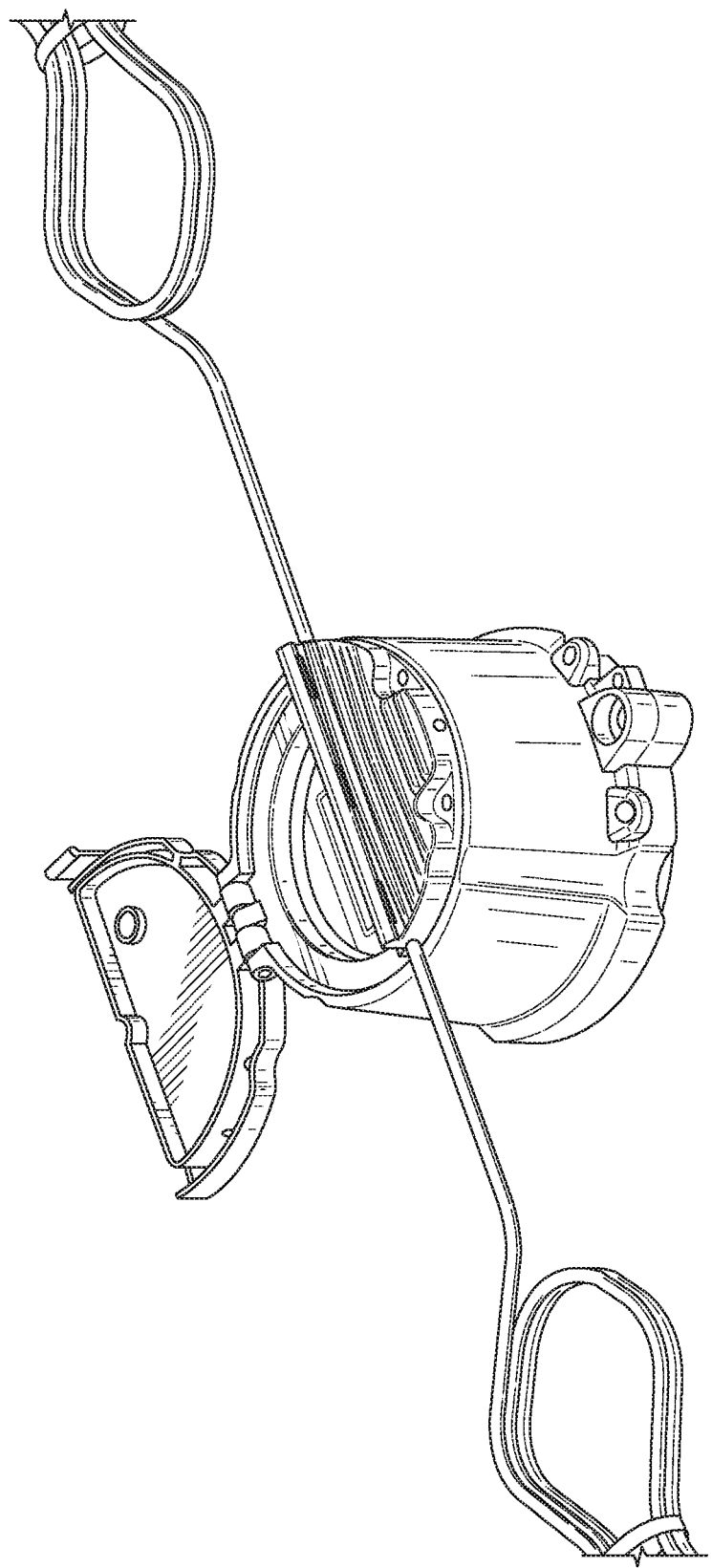
FIG. 7 is a diagram of the register having the communication circuit housing installed therein and a wire coming out of the adapter and not the register itself in accordance with some embodiments of the present inventive concept.

FIG. 7 is a diagram of the register having the communication circuit housing installed therein and wires coming out of the adapter and not the register itself in accordance with some embodiments of the present inventive concept. It will be understood that although FIG. 7 is illustrated as having wires exiting the communication circuit housing, embodiments of the present inventive concept are not limited thereto. For example, some embodiments may be wireless without departing from the scope of the present inventive concept.

Figure 8:
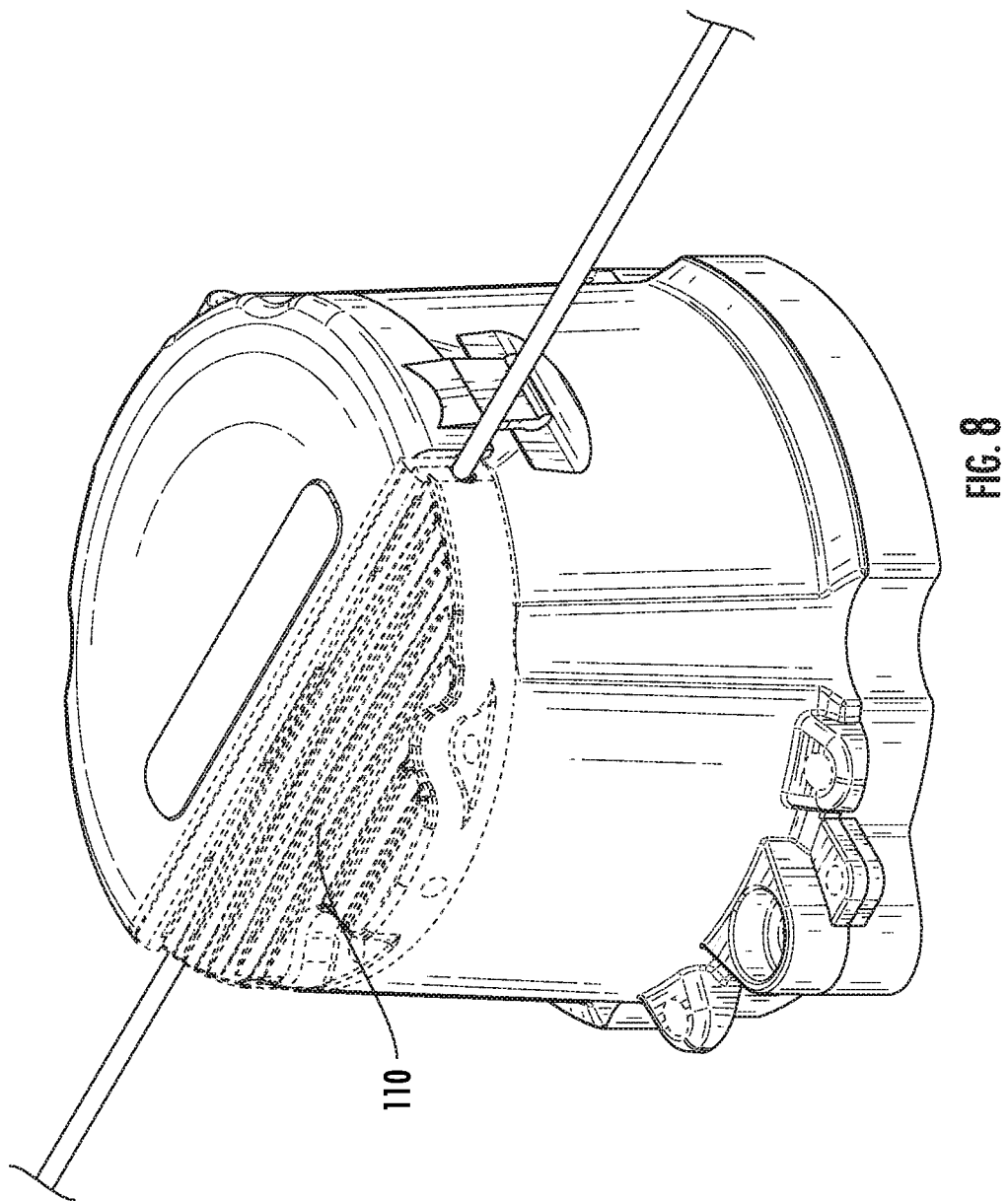
FIG. 8 is a perspective view of the register highlighting the communication circuit housing (e-Hat) in accordance with some embodiments of the present inventive concept.

Thus, embodiments of the present inventive concept reduce, and possibly eliminate, the number of wire exits from the register, which increases field life in an outdoor environment. Furthermore, separation of the communication circuit in its own housing as illustrated in FIG. 8 offers modularity for future advancements by de-coupling the communication system from the device/meter registering system.

Specific embodiments of the present inventive concept are discussed above with respect to FIGS. 1 through 10. These embodiments illustrate a register assembly in combination with a device, for example, a meter. However, embodiments of the present inventive concept are not limited to these embodiments. The decoupling of the device and the communication circuit and providing an optical communication therebetween may be used in various environments as will be discussed further below with respect to FIGS. 11 through 15.

Figure 11:
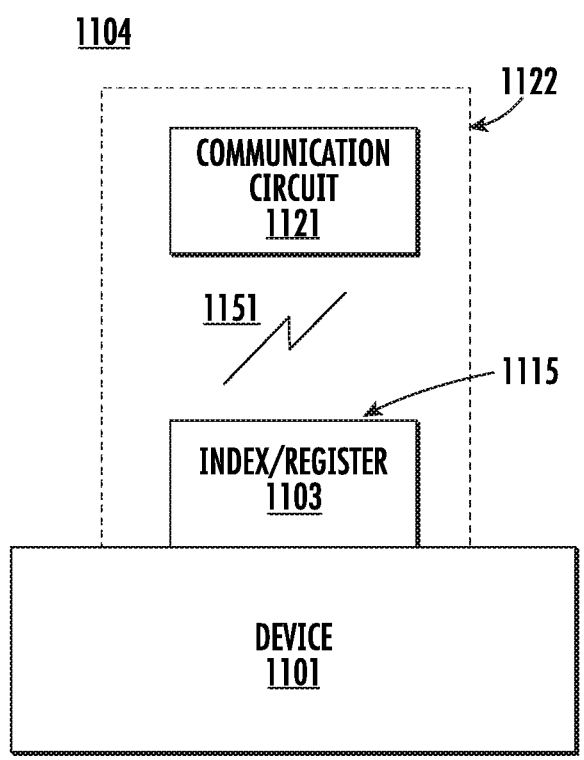
FIG. 11 is a block diagram of a modular system in accordance with some embodiments of the present inventive concept

Referring first to FIG. 11, a diagram illustrating a modular system in accordance with some embodiments of the present inventive concept will be discussed. As illustrated in FIG. 11, the modular system 1104 includes a device 1101, an index or register 1103 associated with the device and communication circuit 1121. The communication circuit 1121 and the index/register 1103 communicate using an optical communication link 1151. Although the index/register 1103 is illustrated in FIG. 11 as being spaced apart from the communication circuit 1121, this is for illustrative purposes only. In fact, the communication circuit 1121 may make physical contact with a translucent surface of the index/register 1103 and the optical communication 1151 is provided therethrough.

In some embodiments, the device 1101 may be a meter, for example, a water meter having the associated register 1103 or gas meter having the associated index 1103. The combination of meter and register/index is referred to herein as a "meter assembly," which may include the meter itself. However, embodiments of the present inventive concept are not limited to this configuration as will be discussed further below.

In some embodiments, the index/register 1103 has a translucent or clear surface (communication barrier) 1115 such that light can pass through the surface 1115. For example, in some embodiments, the surface 1115 can be glass, however, embodiments of the present inventive concept are not limited thereto. The communication circuit 1121 communicates with the index/register circuitry through the translucent or clear surface 1115. In some embodiments, the mode of communication through the glass is infrared (IR). It will be understood that embodiments of the present inventive concept are not limited to IR communications, thus, other types of communications can be used without departing from the scope of the present inventive concept. For example, the communication could be visible light communication, near-field communication (NFC), Bluetooth or any other type of communication that can be utilized as discussed herein.

Physical embodiments of example communication circuits, housings, potting materials, registers and the like are discussed above with respect to FIGS. 1 through 10. It will be understood that embodiments of the present inventive concept are not limited to the particular sizes, shapes, materials and the like discussed above. Other form factors may be used without departing from the scope of the present inventive concept.

Figure 12:
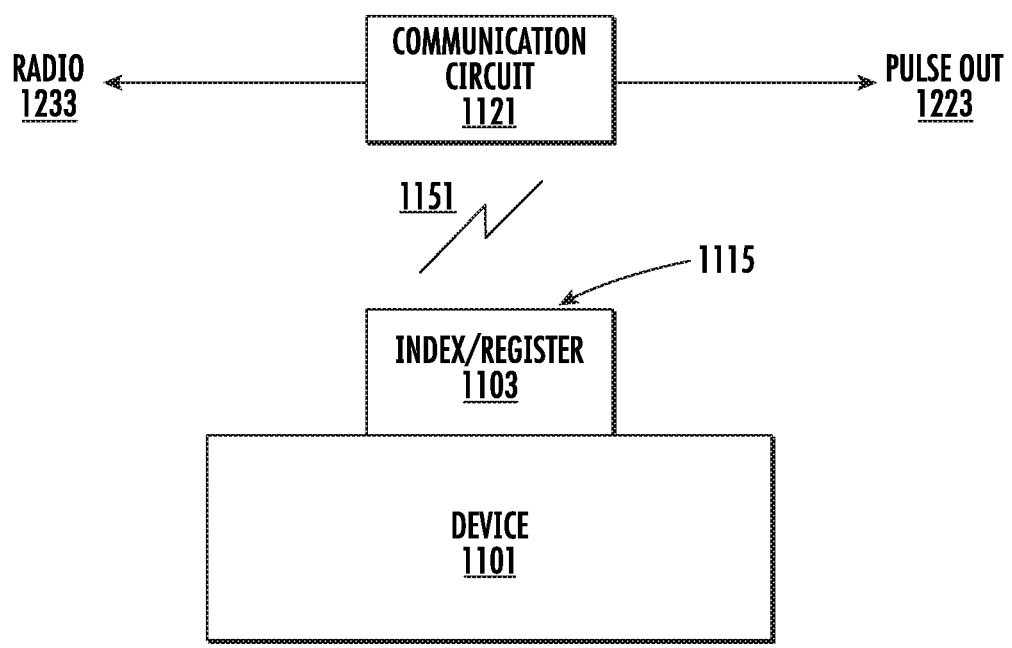
FIG. 12 is a block diagram of a modular system configured for pulse and/or radio communications in accordance with some embodiments of the present inventive concept

Referring now to FIG. 12, the communication circuit 1121 may be configured to communicate with other devices using a pulse output 1223 to/from third party equipment in some embodiments and/or a serial output 1233, which may be used for high or low power radio communications beyond the communication circuit. As discussed above, these communications may be performed wired or wireless depending on the application. It is understood that although both the pulse 1223 and radio 1233 outputs are shown in FIG. 12, only one may be present without departing from the scope of the present inventive concept.

Figure 13A:
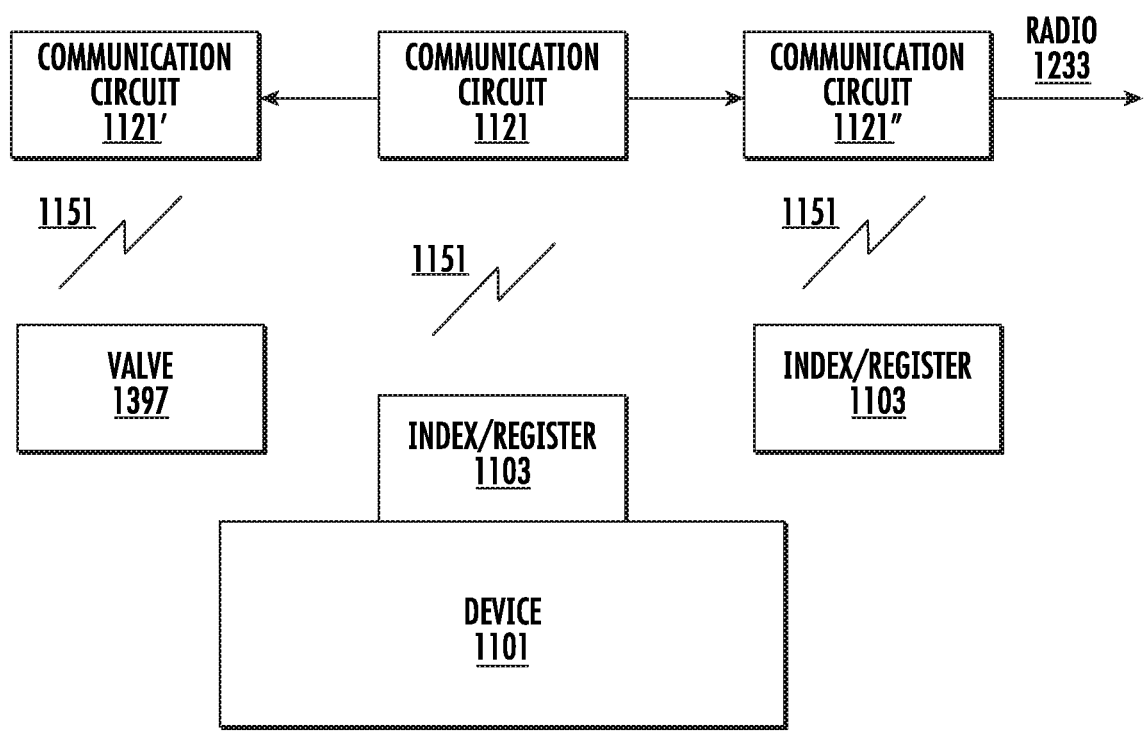
FIG. 13A is a block diagram illustrating daisy chaining devices in accordance with some embodiments of the present inventive concept.
Figure 13B:
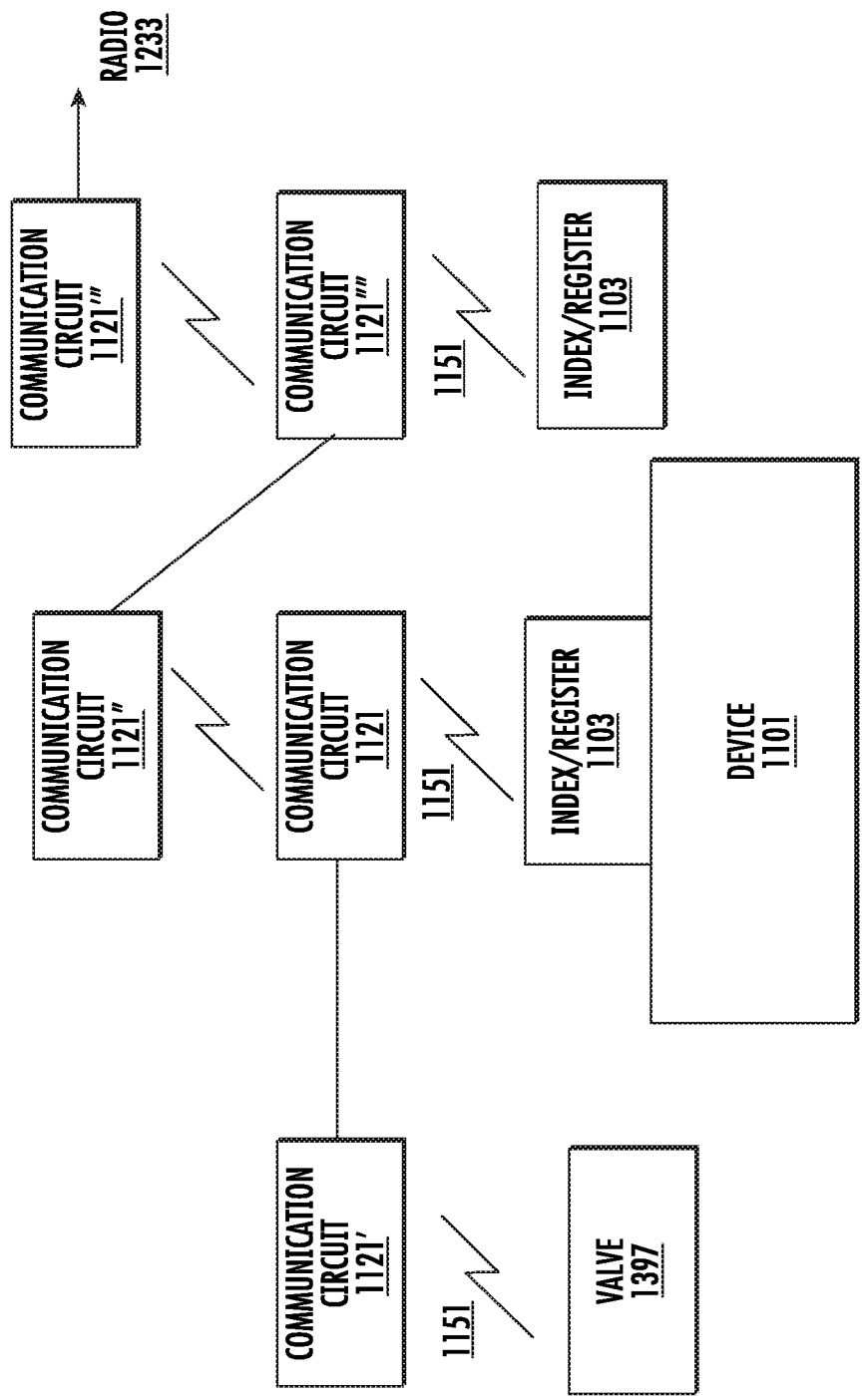
FIG. 13B is a block diagram illustrating daily chaining devices using stacked cables, each with only two ends, in accordance with some embodiments of the present inventive concept.

Referring now to FIGS. 13A and 13B, applications using the decoupled communication circuit 1121 will be discussed. As illustrated in FIG. 13A, the communication circuit 1121 associated with the index/register 1103 and device 1101 may communicate with a communication circuit 1121' associated with a valve 1397. Commands to adjust the valve 1397, for example, turn the gas/water on or off, may be communicated between the communication circuits 1121 and 1121'. Further, the communication circuit 1121 associated with the meter assembly may be used to communicate with yet another communication circuit 1121" associated with another device/meter assembly and so on. Thus, the communication circuits 1121, 1121' and 1121" may be used to daisy chain the various devices together and provide communication therebetween. FIG. 13B illustrates a different configuration for daisy chaining including communication circuits 1121, 1121', 1121", 1121'" and 1121"", such that each only has two endpoints contrary to the configuration in FIG. 13A.

Figure 14:
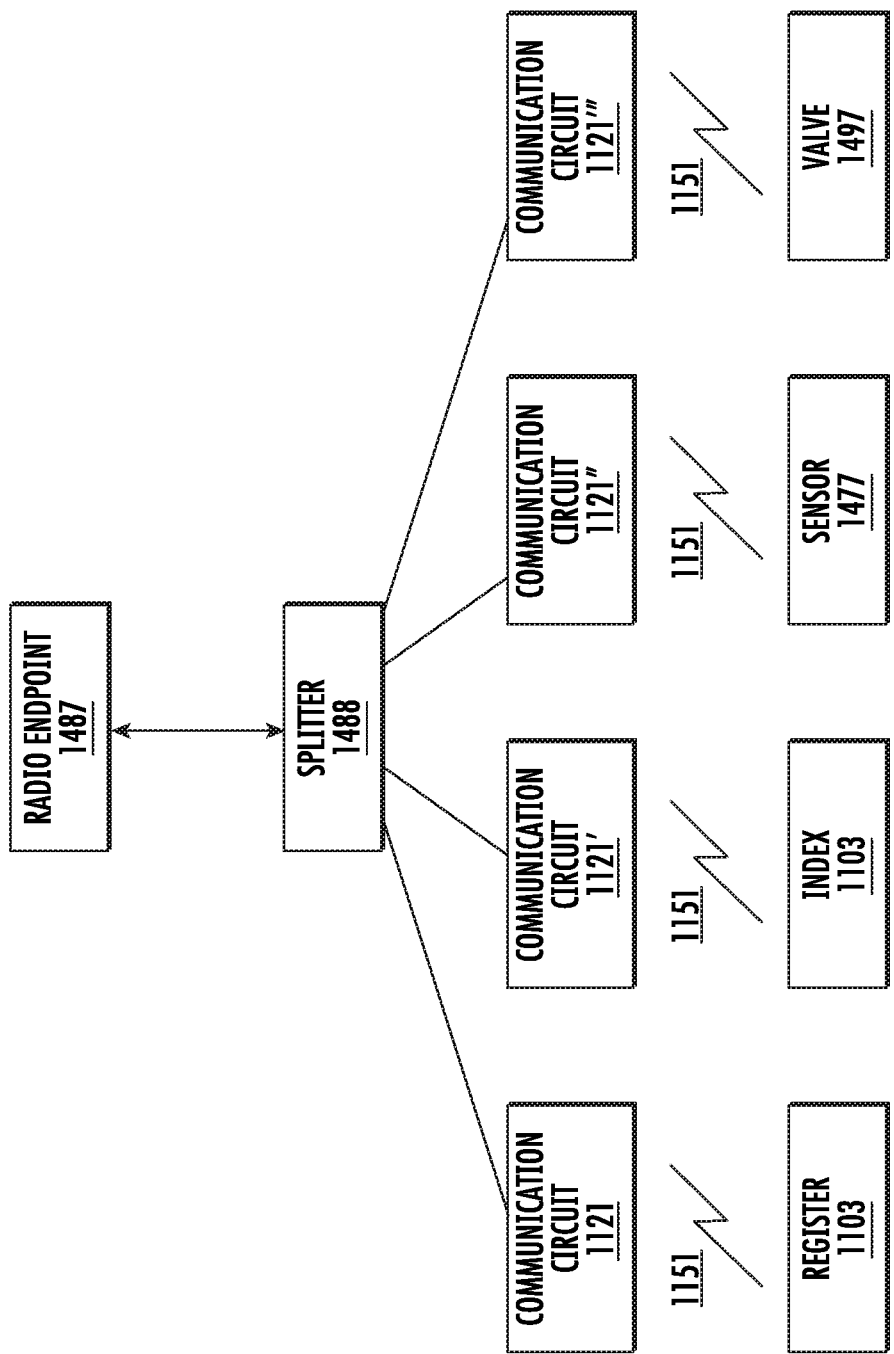
FIG. 14 is a block diagram illustrating coupling various devices to a radio endpoint in accordance with some embodiments of the present inventive concept.

Referring now to FIG. 14, embodiments for connection various devices to an optical (IR) compatible radio endpoint 1487. As illustrated, a splitter 1488 may be used to connect the various devices to the radio endpoint 1487. The splitter 1488 may be active or passive. The devices may include the register 1103 (water), the index 1103 (gas), a sensor or sensors 1477 and/or a valve 1497. The sensor may be any sensor known to those having skill in the art. It is understood that these devices are provided as examples only and embodiments discussed herein are not limited thereto.

Figure 15:
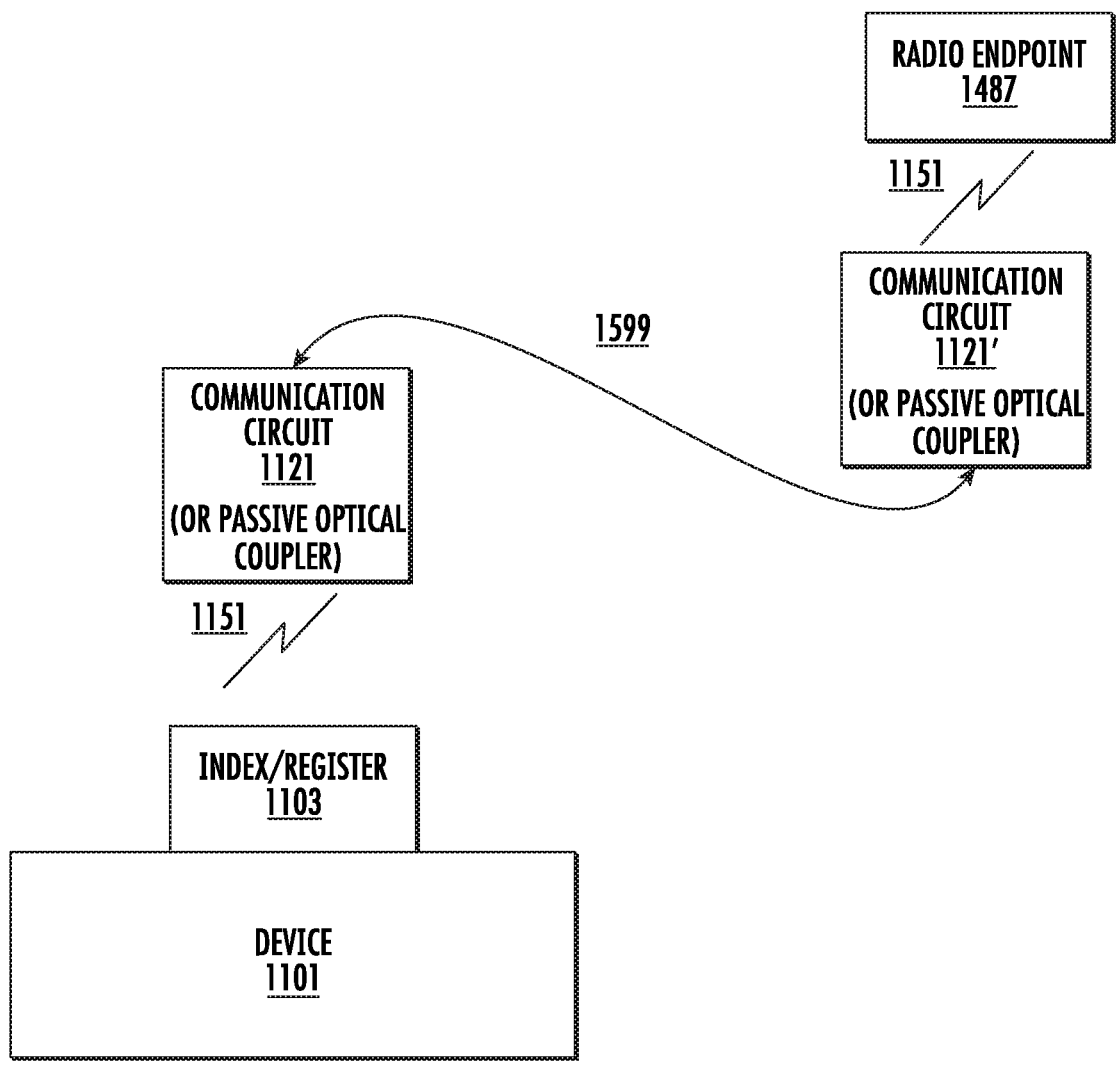
FIG. 15 is a block diagram of a modular system coupled to a radio endpoint over and active or passive cable in accordance with some embodiments of the present inventive concept

Referring now to FIG. 15, embodiments of the present inventive concept using the communication circuit 1121 as a passthrough will be discussed. As illustrated in FIG. 15, the communication circuit 1121 associated with the meter assembly (1103/1101) may be used as a passthrough to one or more other devices, radio endpoint 1487, using the communication circuit 1121' associated therewith. The communication between circuits 1121 and 1121' may be provided by, for example, an active cable or fiber optic passive cable, such as Toslink.

As illustrated in FIGS. 11 through 15, some embodiments of the present inventive concept provide a modular system where multiple indexes may be made radio and/or pulse compatible. These various elements may be "clipped" on and/or off the system allowing a same interface to be used for multiple devices, for example, both water and gas meters. Providing the infrared link to radio communications may provide faster data exchanges between devices. The various embodiments illustrated in FIGS. 11 through 15 illustrate use of the embodiments a passthrough, daisy chaining devices together. Thus, decoupling the communication circuit from the physical device allows use of embodiments discussed herein in modular fashion and provide various capabilities beyond communication with the device itself.

Figure 16:
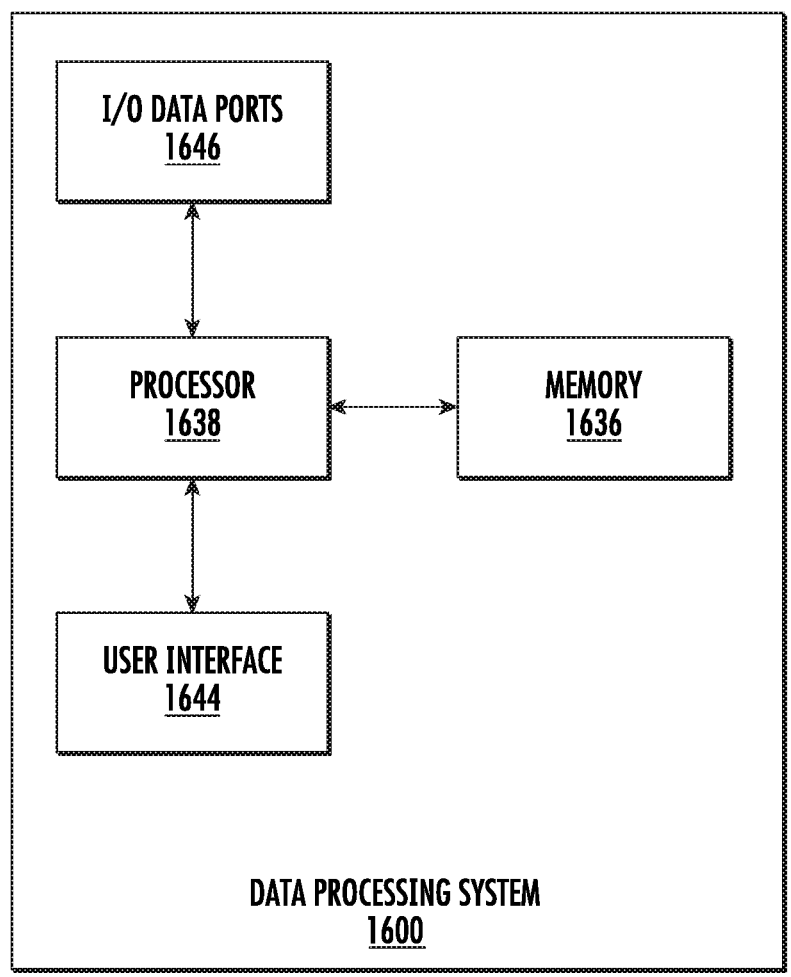
FIG. 16 is a block diagram illustrating a data processing system for use in accordance with some embodiments of the present inventive concept.

As discussed above, embodiments of the present inventive concept allow data to be communicated to remote locations using a communication circuit. Accordingly, some sort of data processing is needed to create and store the data. FIG. 16 is a block diagram of an example of a data processing system 1600 suitable for use in the systems in accordance with embodiments of the present inventive concept. The data processing may take place in any of the devices (or all of the devices) in the system without departing from the scope of the present inventive concept. As illustrated in FIG. 16, the data processing system 1600 includes a user interface 1644 such as a keyboard, keypad, touchpad, voice activation circuit or the like, I/O data ports 1646 and a memory 1636 that communicates with a processor 1638. The I/O data ports 1646 can be used to transfer information between the data processing system 1600 and another computer system or a network. These components may be conventional components, such as those used in many conventional data processing systems, which may be configured to operate as described herein.

As will be appreciated by one of skill in the art, embodiments of the present inventive concept may be embodied as a method, system, data processing system, or computer program product. Accordingly, the present inventive concept may take the form of an embodiment combining software and hardware aspects, all generally referred to herein as a "circuit" or "module." Furthermore, the present inventive concept may take the form of a computer program product on a non-transitory computer usable storage medium having computer usable program code embodied in the medium. Any suitable computer readable medium may be utilized including hard disks, CD ROMs, optical storage devices, or other electronic storage devices.

Computer program code for carrying out operations of the present inventive concept may be written in an object oriented programming language such as Matlab, Mathematica, Java, Smalltalk, C or C++. However, the computer program code for carrying out operations of the present inventive concept may also be written in conventional procedural programming languages, such as the "C" programming language or in a visually oriented programming environment, such as Visual Basic.

Certain of the program code may execute entirely on one or more of a user's computer, partly on the user's computer, as a standalone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The inventive concept is described in part with reference to flowchart illustrations and/or block diagrams of methods, devices, systems, computer program products and data and/or system architecture structures according to embodiments of the inventive concept. It will be understood that each block of the illustrations, and/or combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer readable memory or storage that can direct a computer or other programmable data processing apparatus to function in a particular manner, such that the instructions stored in the computer-readable memory or storage produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

In the drawings and specification, there have been disclosed example embodiments of the inventive concept. Although specific terms are employed, they are used in a generic and descriptive sense only and not for purposes of limitation, the scope of the inventive concept being defined by the following claims.

What is claimed is:
1. A meter assembly comprising:
a register or an index associated with a meter; and
a communication circuit decoupled from the register or the index and configured to communicate with the register or the index using an optical communication link between the register or the index and the communication circuit, wherein an optically compatible radio endpoint is coupled to multiple communication circuits each associated with multiple devices, the optically compatible radio endpoint being coupled to the multiple communication circuits using one of an active and a passive splitter.

2. The meter assembly of claim 1:
wherein when the meter comprises a water meter, the register is associated with the water meter; and
wherein when the meter comprises a gas meter, the index is associated with the gas meter.

3. The meter assembly of claim 1:
wherein the communication circuit further comprises a pulse output to communicate to and from third party devices remote from the meter assembly; and/or
wherein the communication circuit further comprises a serial output used for high power or low power radio communications with third party devices remote from the meter assembly.

4. The meter assembly of claim 1, wherein the communication circuit is further configured to couple one or more additional devices to the meter assembly and provide communication between the one or more additional devices and the meter assembly.

5. The meter assembly of claim 1, wherein the communication circuit is coupled to a device remote from the meter assembly using one of an active or passive cable.

6. The meter assembly of claim 1, wherein the communication circuit is configured to communicate with another communication circuit associate with a valve of the meter assembly and operations of the valve are controlled based on communications between the communication circuits.

7. The meter assembly of claim 1, wherein the optical communications link is provided by an infrared link.

8. The meter assembly of claim 1, wherein the communication circuit is provided in a communications circuit housing, the communication circuit housing comprising:
a first portion configured to receive the communications circuit and having an opening on a first surface thereof; and
a second portion configured to enclose the communication circuit inside the first portion, the communication circuit housing being configured to be received by a register or an index housing such that the communication circuit housing and the register or index housing appear as one unit,
wherein the communication circuit in the communication circuit housing is configured to communicate with the register or the index in the register housing through the opening defined by the first portion of the communication circuit housing.

9. The meter assembly of claim 8, wherein the register or the index further comprises a clear surface between the register or the index and the communications circuit housing and wherein the communication circuit housing further comprises a cap positioned on the opening in the first portion of the communication circuit housing, the cap being configured to contact the clear surface of the register or the index and facilitate optical communication between the communication circuit and the register or the index.

10. A communication circuit housing comprising:
a first portion configured to receive a communication circuit board and having an opening on a first surface thereof; and
a second portion configured to enclose the communication circuit board inside the first portion, the communication circuit board housing being configured to be received by a housing of a separate device such that the communication circuit housing and the housing of the separate device appear as one unit,
wherein the communication circuit board in the communication circuit housing is configured to communicate with a device in the device housing through the opening defined by the first portion of the communication circuit housing.

11. The communication circuit housing of claim 10, wherein the communication circuit housing comprises a plastic injection molded housing.

12. The communication circuit housing of claim 11, wherein the communication circuit housing comprises a glass filled polycarbonate material.

13. The communication circuit housing of claim 10, wherein the first portion of the communication circuit housing is configured to receive a potting material in the first portion of the communication circuit housing, the potting material extending around all surfaces of the communication circuit board in the first portion of the communication circuit housing.

14. The communication circuit housing of claim 10, further comprising a cap positioned on the opening in the first portion of the communication circuit housing, the cap being configured to contact a clear surface of the device and facilitate optical communication between the communication circuit board and the device.

15. The communication circuit housing of claim 14, wherein the cap comprises a material including silicone and the clear surface comprises glass.

16. The communication circuit housing of claim 14, wherein the optical communication comprises one of infrared communication, visible light communication, near-field communication and Bluetooth.

17. The communication circuit housing of claim 10, wherein the device comprises a register.

18. The communication circuit housing of claim 17, wherein the register is configured to be used with one of a water meter and a gas meter.

19. The communication circuit housing of claim 10, wherein the communication circuit board communicates with the device through the opening without any wires.

* * * * *

UNITED STATES PATENT AND TRADEMARK OFFICE
CERTIFICATE OF CORRECTION

| | |
|---|---|
| PATENT NO. | : 11,555,718 B2 |
| APPLICATION NO. | : 16/745891 |
| DATED | : January 17, 2023 |
| INVENTOR(S) | : Hansen et al. |

It is certified that error appears in the above-identified patent and that said Letters Patent is hereby corrected as shown below:

In the Specification

Column 3, Line 31: Please correct "illustrating daily chaining"
    To read -- illustrating daisy chaining --

Column 9, Line 1: Please correct "1121‴ and 1121⁗"
    To read -- 1121‴ and 1121⁗ --

Signed and Sealed this
Fourteenth Day of March, 2023

*Katherine Kelly Vidal*
Katherine Kelly Vidal
*Director of the United States Patent and Trademark Office*